Figure 1:
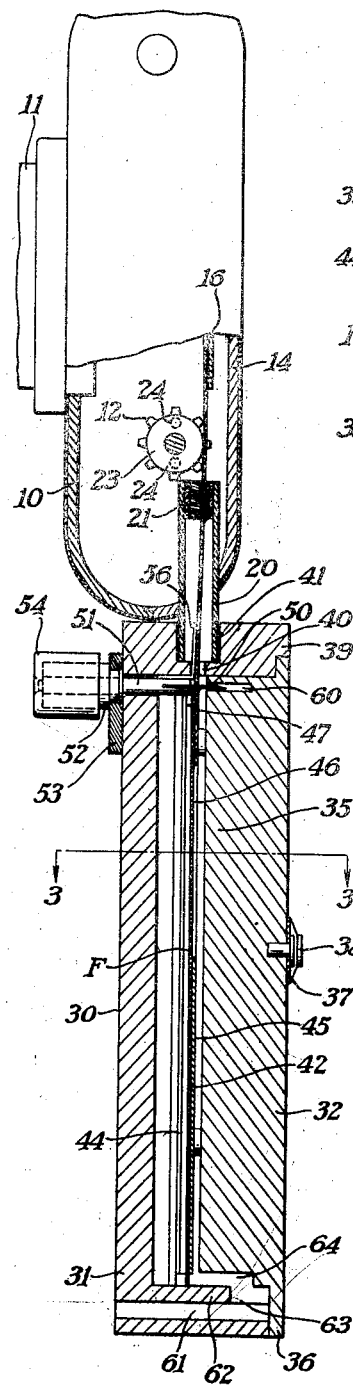

July 9, 1946.  D. C. HARVEY  2,403,717
PHOTOGRAPHIC APPARATUS
Filed Aug. 3, 1944  2 Sheets-Sheet 1

DOUGLASS C. HARVEY
INVENTOR

BY *Newton Perrins*
*Karl T. Haramy*
ATTORNEYS

July 9, 1946.   D. C. HARVEY   2,403,717
PHOTOGRAPHIC APPARATUS
Filed Aug. 3, 1944   2 Sheets-Sheet 2
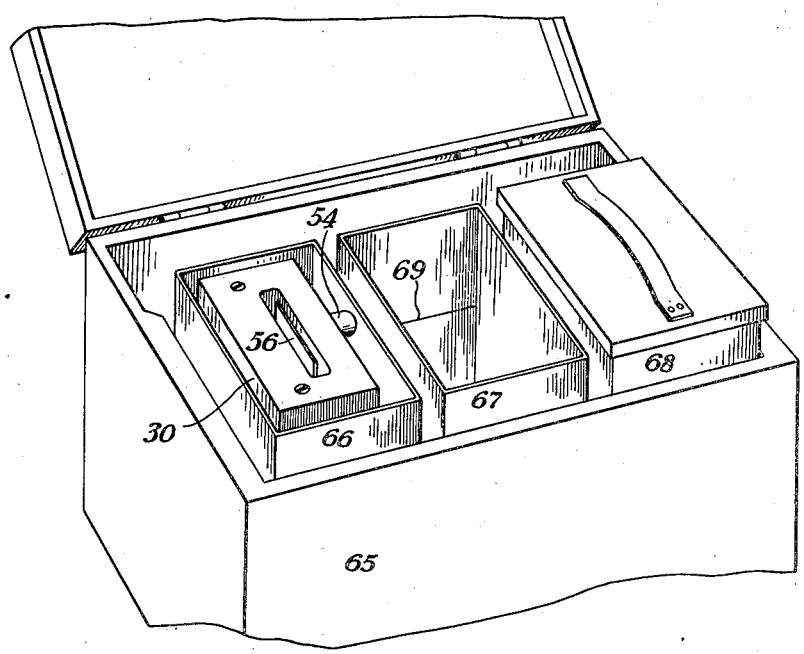
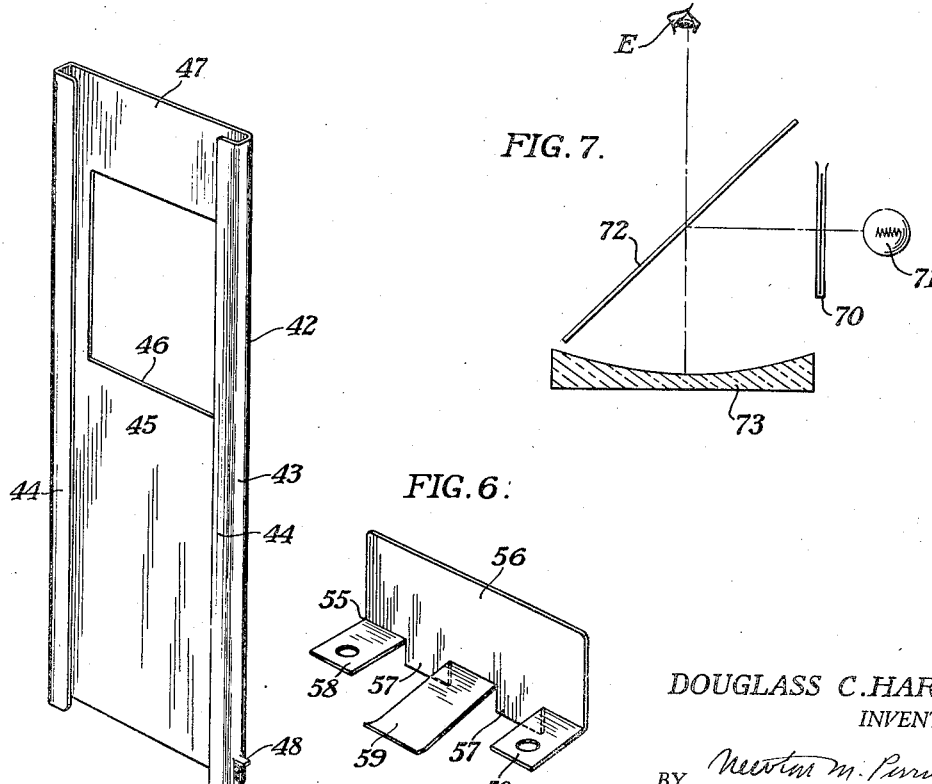
DOUGLASS C. HARVEY
INVENTOR
BY *Newton M. Perris*
*Earl J. [illegible]*
ATTORNEYS Patented July 9, 1946

2,403,717

UNITED STATES PATENT OFFICE 2,403,717

PHOTOGRAPHIC APPARATUS

Douglass C. Harvey, Rochester, N. Y., assignor to Eastman Kodak Company, Rochester, N. Y., a corporation of New Jersey Application August 3, 1944, Serial No. 547,879

11 Claims. (Cl. 95—13)

The present invention relates to photography, and particularly to quick processing equipment for a conventional still camera.

At present the Navy is using a well-known 35-mm. still camera for taking pictures through the periscope of a submarine for reconnaissance purposes. One camera which is being used for this purpose is the Kodak "35" equipped with a special finder system so that the field can be viewed at the same time the picture is being taken.

For certain purposes, such as choosing a particular ship from a convoy as a target for a torpedo, it has been found desirable to snap a picture of a convoy and process it immediately for study so that the most important vessel may be selected as the target. All of this must be done as rapidly as possible so that the target remains in range and the submarine is not detected in the interim.

Therefore, the principal object of the present invention is the provision of rapid processing equipment for use with a still camera which allows the processing and viewing of a picture of a potential target in approximately one minute from the time the exposure is made.

Another object is the provision of processing equipment of the type set forth which is decidedly compact for use in confined quarters and which is simple and rugged so that expert operators and careful handling of the equipment is not too important.

And a further object is the provision of processing equipment of the type set forth in which the film upon exposure is fed directly from the camera into a processing cassette which, though it is light tight, permits free circulation of a fluid therethrough so that the cassette with a film enclosed may be directly immersed in one or more tanks of solution for processing purposes.

And another object is to provide a processing cassette in which the film is held in a removable film holder so that it can be readily removed from the cassette while wet for viewing purposes, and thereafter be replaced in the proper solution for further processing without the wet film being touched by hand or equipment.

And yet another object is to provide a special back for a conventional still camera which permits the use of this processing equipment with such a camera without in any way affecting its normal operation.

Still another object is to provide a processing cassette which is directly connectable to a special camera back in a light-tight manner to receive the film from the camera as it is exposed, and which, after being loaded, serves as a light-tight container in which the film can be processed by immersion of the cassette into a tank of solution.

Figure 3:
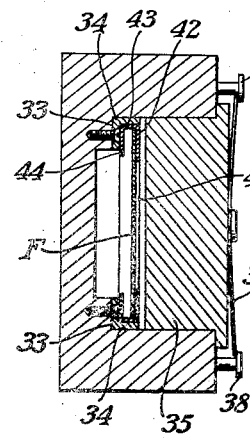
Figure 2:
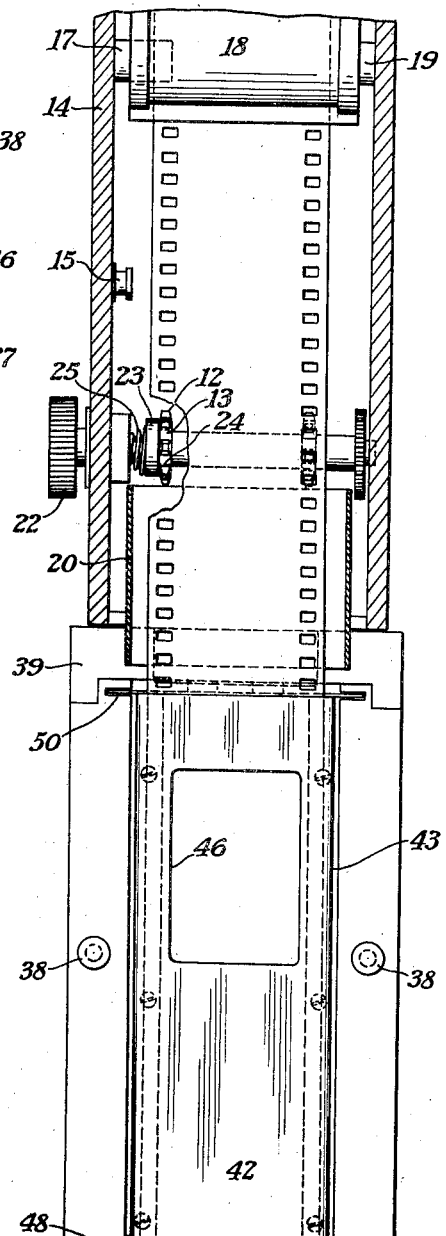
Figure 8:
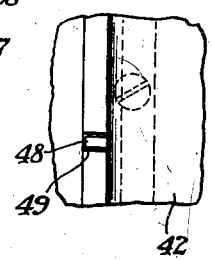

The novel features that I consider characteristic of my invention are set forth with particularity in the appended claims. The invention itself, however, both as to its organization and its methods of operation, together with additional objects and advantages thereof, will best be understood from the following description when read in connection with the accompanying drawings in which, Fig. 1 is a view, mostly in section, showing a processing cassette constructed in accordance with one embodiment of the present invention and in loading position relative to a conventional camera having a special back constructed in accordance with one embodiment of the present invention, Fig. 2 is a view from the right of Fig. 1 and with the cover of the processing cassette removed and the camera back in section to show the position of the film in the camera and the film feeding means, Fig. 3 is a sectional view of the cassette taken substantially on line 3—3 of Fig. 1, Fig. 4 is a perspective view of processing equipment including three tanks adapted to contain different solutions necessary to film processing, and showing the processing cassette immersed in the first one of these tanks, Fig. 5 is an enlarged perspective view of the removable film holder that goes into the cassette, Fig. 6 is an enlarged perspective of the combined shear and guide plate which is mounted in the entrance of the cassette, Fig. 7 is a diagrammatic view showing how the wet film in the holder may be viewed while wet, and Fig. 8 is an enlarged fragmentary detail showing how the positioning lug on the film holder engages a notch in the supporting rail of the cassette to ensure proper orientation of the film holder in the cassette.

Like reference characters refer to corresponding parts throughout the drawings.

In general, the present invention relates to processing equipment by the use of which an exposed frame of film can be removed from the camera immediately after exposure and can be developed and the negative viewed in a matter of seconds after exposure. After a preliminary examination which permits the desired data to be observed, the developed film is returned to the proper processing solutions for complete fixing and washing. By virtue of the equipment this entire procedure can be carried out in daylight without danger of fogging the film and without the danger of having the wet emulsion touched by hand or any other surface.

One of the steps involved in the use of this equipment necessitates feeding a frame of film immediately after exposure from the camera into a processing cassette. This, of course, requires the use of a special camera back that does not employ the usual film take-up roll but has provision for feeding the film directly from the camera body. While it will be obvious that a camera could easily be designed to be adapted for such a job, the present invention will be described in connection with an arrangement designed for use with a standard 35-mm. camera already on the market and which in no way affects the normal operation of such a camera when it is used with its regular back.

The conventional camera in connection with which the present invention will be described is one well known as the Kodak "35." This camera is a still camera of the miniature type which uses 35-mm. film. It comprises a body portion which includes the lens, shutter, a spool chamber on one end for receiving a supply of an unexposed film from which the film is fed across the exposure frame over a measuring sprocket to a take-up spool which is manually controlled by a knob on the body for advancing the film. The camera is closed by a back which fits the body in a light-tight manner and includes a film pressure pad which acts to hold the film flat over the exposure frame in the camera body. The back also includes a releasable latch member which is adapted to cooperate with the latch element on the camera body to lock the two parts in assembled relation.

The camera in question is shown in U. S. Patents 2,266,426 and 2,266,161 to which reference can be had for a complete understanding of the body and back construction and the film advancing means, respectively. So far as the present invention is concerned, however, the only thing about the conventional camera itself that is of interest is that the film is advanced by being taken up on the take-up spool which is rotated by hand and that the intermediate film sprocket is rotated by the advancing film to operate a film measuring and double-exposure prevention mechanism. The only modification in the conventional camera construction which is necessitated by the use of the present invention is the drilling of two holes in the flange of this measuring sprocket so that a winding knob on the special back can be clutched to the sprocket to provide a manual film-advancing means which will feed the film directly from the camera body after exposure.

Referring now to Figs. 1 and 2, the conventional camera body is designated as 10 and includes a lens mount indicated generally as 11. As clearly shown in Fig. 2, the camera body includes the film measuring sprocket 12 which is adapted to engage the perforations in the 35-mm. film when the special back is placed on the camera, and the flange 13 of which sprocket is provided with two diametrically spaced holes so that it will engage with a clutch member on the special back.

The special back which constitutes part of the present equipment is indicated at 14. It is the same general shape as the conventional back and fits onto the camera body in exactly the same manner as, and in place of, the conventional back. It includes a latch member 15 and a film pressure pad 16 the same as a conventional back.

This special back 14 differs from the conventional camera back in the following respects. At one end it includes a stationary hub 17 on which one end of a film supply retort 18 is adapted to be mounted, see Fig. 2. When the film loaded back is placed on the camera body, as shown in Fig. 2, the other end of the retort is adapted to rotatably engage a stationary hub 19 in the camera body. The other end of the back is provided with a film exit in the form of an oblong chute 20, which extends a substantial distance both inside and outside of the back. This chute is rendered light tight by the use of cooperating layers of felt or plush 21 adjacent the end thereof extending into the back.

On the bottom wall of the back there is rotatably mounted a film advancing knob 22 which terminates inside of the camera body in a clutch member comprising disk 23 having two diametrically spaced pins 24 extending from the face thereof, see Fig. 1. It is these pins which are adapted to snap into the holes in the flange 13 of the measuring sprocket 12 in the camera body and positively connect the winding knob 22 to the sprocket to provide the necessary film advancing means. The winding knob is capable of a limited axial movement in order to permit engagement and disengagement of the pins 24 with the holes in the flange of the sprocket as the back is placed on, and removed from, the camera body, and a coil compression spring 25 is provided to normally force the knob toward its innermost position.

To load the camera with film, the film retort 18 is placed in the special back 14 with the film emulsion side up and with the retort hub over the hub 17 in the camera back. The film is then threaded across the back over the pressure pad 16 and the end thereof is threaded through the chute 20, in the manner shown in Fig. 2, being sure that the film lies between the two layers of plush in the chute. The back is then placed on the camera, being careful not to tear the film perforations with the sprocket teeth in the camera, and with the winding knob 22 pulled out as far as possible. After the back is locked in place, the end of the film protruding from the chute 20 is pulled gently to engage the film perforations with the sprocket 12. The winding knob in the back is released and turned until the pins 24 snap into engagement with the holes in the flange of the sprocket 12. Three frames of film are then advanced through the camera by turning a knob 22. This amount of film is fogged during the loading operation. The double-exposure prevention release shown in U. S. Patent 2,226,161 is part of the camera and must be operated in the conventional manner to permit the film to be advanced. The film is then cut, or broken, off about one-quarter inch from the end of the chute and the camera is ready for the first exposure.

After the frame in exposing position in the camera has been exposed, the processing cassette 30, constituting a part of the present invention, is placed on the camera in the manner and position shown in Figs. 1 and 2, and the exposed film is ready to be fed thereinto for processing.

The cassette, which is shown in substantially full size in Fig. 1, is made from material inert to photographic processing solutions, e. g. Bakelite being preferable because it is dull black, and comprises a bottom or box portion 31 the open end of which is adapted to be closed by a cover 32. As shown in Fig. 3, the box portion is not the same depth throughout its width but each edge of the bottom is provided with an upstanding rail 33 extending the length of the box and having L-shaped guides 34 fastened thereto by screws or the like. These guides act to position a film holder 42, to be described hereinafter, so that processing solutions entering the cassette are free to contact the emulsion surface of the film strip positioned in the cassette. The cover 32 has a deep central portion 35 which is adapted to telescope with the interior of the box portion and is provided with overhanging lips 36 engaging the top of the box to provide a light-tight connection between the two. The cover is locked on the box by compressing the ends of a spring member 37 pivotally mounted on the top of the cover and moving them beneath the heads of two pins 38 extending from the top of the opposite side walls of the box, see Fig. 3.

One end wall 39 of the cassette, which is fairly thick, is provided with a film entrance comprising a narrow slot 40 extending from the inside face of the end wall part way through the wall and communicating with the wider slot 41 extending to the outside face of the end wall. The wider slot 41 is of such a width and length that the end of the film chute 20 on the camera back is adapted to snugly telescope therewith for the dual purpose of attaching the cassette onto the camera back and providing a light-tight connection between the two when so connected, see Fig. 1. When the cassette is mounted on the camera back in this manner, the exposed film is capable of being fed from the camera directly into the cassette by manipulation of the winding knob 22 on the camera back.

A film holder 42 of the type best shown in Fig. 5 is adapted to be removably positioned in the cassette to receive the portion of film strip fed thereinto. The film holder comprises a channel-shaped frame and is made of a material inert to processing solutions, e. g. stainless steel. The holder is just slightly wider than the 35-mm. film and is long enough to support three frames of film, which is the length of film required to be fed for each exposure in the conventional camera structure involved. The upper ends of the arms 43 of the holder are turned over as shown in 44 to retain the edges of the film strip inserted thereinto. The web portion 45 of the holder is provided with a framing aperture 46 of such a size as to frame the exposed frame of film. As will be further set forth, this framing aperture is so located in the holder that when a film strip is fed thereinto from the camera the exposed frame will be aligned therewith for viewing purposes.

As shown in Figs. 1, 2, and 3, this film holder is positioned in the cassette so that the longitudinal turned-over edges 44 thereof are supported on the guides 34 so that the open end 47 thereof is in alignment with the film entrance. So that when the film is fed into the holder in the camera through the entrance to the cassette, it will lie with its emulsion surface directed toward the open side of the holder for free access of the processing solutions, and so that the framing aperture 46 of the holder will be positioned to frame the exposed frame of film, it is necessary that the holder be positioned in the cassette in a given endwise orientation. To this end, the film holder is provided with a positioning lug 48 struck up from one longitudinal edge thereof and which is adapted to drop into a corresponding notch 49 provided in the upstanding arm of one of the L-shaped guides 34 in the cassette when the holder is properly oriented in the cassette, see Fig. 8. The cooperation between this positioning lug and the corresponding notch in the cassette not only insures the holder being properly oriented in the cassette, but also acts to hold the holder against endwise movement in the cassette. If the film holder is not properly oriented when placed in the cassette, the positioning lug 48 will hit the top of the guides 34 and will be prevented from dropping down into the cassette by a sufficient amount to permit the cover being placed on the cassette.

Slidably mounted in the bottom of the cassette adjacent the film entrance is the knife structure for severing the film strip which has been inserted into the cassette from that remaining in the camera. This knife structure includes a knife blade 50 which extends completely across the bottom of the cassette and overhangs the inside walls thereof, see Fig. 2, to provide a light-tight seal for the entrance when in a depressed position. This knife blade is fastened to the lower end of a post 51 the upper end of which extends through a bore in a bearing 52 fastened to a metal strip 53 on the outside of the bottom of the cassette. The upper end of the post 51 is staked to a cap 54 which in turn telescopes with the bearing 52 and serves as a handle for operating the knife. There is a slight amount of friction between the cap and bearing and between the post and the bore in the bearing so that the knife will remain in either its retracted or depressed position.

When the knife blade 50 is retracted by pulling out on the cap 54, the film entrance is opened and the film can be fed from the camera directly into the film holder positioned in the cassette. Then after the three frames of film have been fed into the cassette, the knife is depressed by pushing on the cap 54 whereupon the film in the cassette is severed from that in the camera. To facilitate shearing of the film strip, and to facilitate guiding the film strip into the cassette, a combination guide and shear plate 55, of the type best shown in Fig. 6 is mounted in the film entrance of the cassette. Referring to Figs. 1 and 6, this combination guide and shear plate 55 is fastened to the end wall of the cassette so that the guiding tongue 56 thereof extends outwardly in the film entrance to aid in directing the naturally longitudinally bowed film from the camera into the cassette, and the two shear tabs 57 extend into the cassette adjacent the knife blade to act as a shear block for the knife. Two down-turned perforated tabs 58 engage the inside of the end wall of the cassette and screws are passed therethrough to attach the plate to the cassette. A longer tab 59 also engages the inside face of the end wall between the tabs 58 and acts to give the plate the desired rigidity.

After the knife blade has been depressed to cut the film extending into the cassette it extends into a slot 60 in the under side of the cover 32 to provide a light-tight joint for the entrance of the cassette. It will be noticed that the peculiar cap 54 and bearing 52 combination also provides a light-tight connection. It is further pointed out that the slot 60 in the cover is slightly wider than the knife blade 50 so that while a light-tight joint is provided by the two, a joint is provided which is capable of passing a fluid or air so that the cassette can be used as a daylight developing tank when removed from the camera.

The other end of the cassette is provided with a tortuous opening which is light tight but which is capable of allowing the circulation of liquid. As shown in Fig. 1, this tortuous path is made up of a slot 61 extending from the bottom of the cassette longitudinally of the end wall 62 to a cut-out 63 in the top edge of said end wall. The end of the cover 32 is in turn provided with a staggered cut-out portion 64 which cooperates with the cut-out 63 in the end wall of the cassette to provide the desired tortuous path. Therefore, when the knife blade 50 is depressed a light-tight cassette is provided so that the film F in the holder within the cassette will not be fogged when the cassette is removed from the camera.

The exposed frame is now in the cassette ready for processing and the camera is ready for another exposure. For processing of film, the apparatus shown in Fig. 4 is provided. This includes a carrying case 65, which is provided, along with space for the cassette, camera back and film holders, with three stainless steel tanks 66, 67, and 68. The tank 66 is for the developing solution, the tank 67 is for a fixing bath, and tank 68 is for water. Each tank is scored on the inside, as shown at 69 in tank 67, to show the proper liquid level. With solutions at the liquid level line, the bulk of the cassette when immersed therein, as shown in tank 66, will raise the solution in the cassette to the proper level to completely cover the film strip F positioned in the cassette.

Therefore, after the cassette loaded with film is removed from the camera it is first immersed in tank 66, see Fig. 4, for development of the film. Due to the particular construction of the cassette the developing solution is free to circulate into the same and over the film which it supports so that the emulsion side thereof is not in contact with any portion of the cassette and is freely accessible to the solution, see Fig. 3. After a short development time the cassette is pulled from tank 66 and is immersed in the fixing bath 67 sufficiently long to permit viewing. If one of the fastest films is used with a recommended developer and fixing solution at a temperature of about 80° F. it has been found that the development time is about 15 seconds, and the fixing time necessary to effect sufficient clearing of the negative for viewing is a matter of seconds. It is suggested that about every five seconds the cassette is in each of the developing and fixing baths that it be periodically raised and lowered therein to secure agitation of the solution.

After the film has been in the fixing bath a sufficient time to clear, the cassette is removed from the bath and the cover 32 is removed therefrom. The film holder 42 with the film F in place is then removed from the cassette and is placed in a suitable viewing apparatus for inspection of the negative. The film can be left in the holder for viewing purposes because the exposed frame of film will be located opposite the framing aperture 46 of the holder by virtue of the construction of the several parts and the proper orientation of the holder in the cassette. There is, therefore, no need for directly handling the wet film during the viewing operation with the possible danger of injuring the emulsion surface while it is wet and not completely fixed.

A suitable viewing apparatus may comprise an optical system of the type schematically shown in Fig. 7. This apparatus would include a stage 70 into which the film holder could be located with the framing aperture 46 therein in alignment with a light source 71. The image of the film would then be reflected by a 45-degree semitransparent plate 72 downwardly onto a spherical concave reflector 73 which would in turn reflect it through the plate 72 to the eye E. With such a system it is possible to obtain a suitable degree of magnification of the image to insure easy reading thereof.

After the desired information has been obtained from the negative, the negative in its holder should be returned to the fixing bath to complete hardening after which it may be rinsed in the washing tank 68 and be dried for permanent record.

The complete cycle of use of the present processing equipment will now be described. The cassette is opened, and a film holder is inserted therein in the proper position. The cassette is then closed, the knife is retracted to open the film entrance and the cassette is slipped onto the film chute on the camera back. The exposure is then made and three frames of film are then advanced into the cassette by rotating the winding knob 22 on the camera back. This loads the exposed frame of film into the cassette and positions a new length of film in the camera for the next exposure.

The knife is then pushed down to cut the film strip and render the cassette light tight but capable of liquid circulation. The cassette is then slipped from the camera back and immersed in the developing tank for the necessary few seconds, periodically raising it and lowering it to secure agitation, and it is then immersed in the fixing bath for a time sufficient to clear the film negative. Then the cassette is opened and the film holder is placed on the stage in a suitable vewing apparatus for inspection. After viewing, the film holder with the film strip still in situ is returned to the fixing bath for complete hardening, after which it is immersed in the washing tank and then dried for permanent record. The time lapsing between the instant an exposure is made and the instant the developed negative is ready for viewing is a little over one minute. All of the time, until the film is developed and then rapidly fixed, the film is contained in the cassette which is not only light tight but permits ready circulation of the processing solutions therethrough so that the film can be developed and fixed in situ in the cassette. The film holder which forms a part of the cassette serves not only to properly hold the film strip so that its emulsion surface is not contacted by any surface and is readily accessible to the processing solution, but also provides a means by which the wet film can be removed from the cassette and be viewed without danger of the film being injured by contact with the hands or any surface.

While in the present embodiment of the device three exposure frames of film are required to be fed into the cassette for every exposure made, this is because a conventional existing camera is being adapted to do a job for which it was not previously designed. If a camera were to be designed particularly for this type of work, the parts could be proportioned so that the exposed frame of film would be fed into the cassette with only a very short length of film wasted for leader purposes. At the same time, such a camera could be designed so that the film winding means of the camera itself could be used to advance the film into the cassette, thereby eliminating the need for the supplemental winding knob on the present special camera back.

Although I have shown and described certain specific embodiments of my invention, I am fully aware that many modifications thereof are possible. My invention, therefore, is not to be limited to the precise details and construction shown and described, but is intended to cover all modifications coming within the scope of the appended claims.

Having thus described my invention, what I claim as new and desire to secure by Letters Patent of the United States is:

1. A combined auxiliary camera back and film processing cassette for use in place of the standard back on a camera body including a rotatable film-feeding member for advancing a film strip across the exposure plane of said camera, and comprising in combination a camera back complementary in shape and size to said standard camera back, and adapted to fit the camera body in a light-tight manner, means on said back for releasably attaching it to said camera body, means at one end of said back for rotatably supporting a supply roll of unexposed film, a light-tight film exit in the other end of said camera back through which the film is directed immediately after it crosses the focal plane and is exposed, a film advancing knob on said back, a clutch member connected to said knob and extending to the interior of said back for releasably connecting said knob to said film-feeding member, a cassette having a film chamber, means in said chamber for supporting a length of film so that the emulsion side thereof is free from contact with any surface, said cassette provided with a film entrance extending through one wall and into communication with said chamber, means for detachably connecting said cassette to said camera back so that the exit on said back and film entrance in said cassette are in light-tight communication, and a length of exposed film fed through said exit will be fed into said film supporting means in said cassette, means for severing the length of film in said cassette from that in the camera, and means for rendering said cassette light-tight but free for circulation of processing fluid into and out thereof, so that when the cassette is removed from said back and is immersed in a tank of processing solution, the solution will contact the emulsion side of the film therein.

2. A photographic apparatus according to claim 1, in which the film supporting means in the cassette comprises an open ended channel shaped holder which is adapted to be removably inserted into said chamber with one end thereof in alignment with the entrance of said chamber and which is adapted to engage the film fed thereinto only at the edges, and cooperating positioning means on said holder and in said chamber for defining the proper orientation and positioning of said holder in said chamber so that film fed into said cassette from the camera will enter the holder from a given end and with its emulsion side directed toward the open side of said holder.

3. A photographic apparatus according to claim 1, in which the film exit in said auxiliary back comprises a light trapped chute extending a substantial distance from the camera body, and in which the film entrance in the cassette includes an opening complementary in size to said chute and adapted to slip over the same to mount the cassette on the camera.

4. A photographic apparatus according to claim 1, in which the film severing means comprises a knife mounted in said cassette to move between an inoperative position, wherein it opens said film entrance, and an operative position, wherein it moves across said film entrance to cut the film and cooperates with a slot provided in the cassette to provide a light trap for said entrance which permits the circulation of fluid into or out of cassette.

5. A photographic apparatus according to claim 1, in which the film severing means comprises a knife reciprocally mounted in said cassette to one side of said film entrance to move between an inoperative position, wherein it lies to one side of and opens said film entrance, and an operative position, wherein it moves across said entrance to sever the film and cooperates with a slot provided in the cassette to provide a trap which is light-tight but capable of passing a fluid, and a second trap in said cassette which is light-tight but capable of passing a fluid and disposed remotely from said first trap, whereby a light-tight cassette is provided which when immersed in a tank of processing solution will permit circulation of the solution over a film positioned therein.

6. A film processing cassette for receiving a short length of exposed film directly from a camera having an exit through which film is adapted to be fed immediately after exposure and comprising an open-ended box, a removable light-tight cover for said box, means in said box for supporting a length of exposed film at its edges only and with the emulsion surface thereof spaced from all surfaces, a film entrance extending through one wall of the box in alignment with said film supporting means and terminating in a portion complementary in shape and size to the film exit on said camera to cooperate therewith to form a light-tight conduit from the camera to the interior of the cassette through which the exposed film may be fed directly from the camera into the cassette, a knife reciprocally mounted in the bottom of the box to move between an inoperative position wherein it lies to one side of said film entrance, and an operative position, wherein it moves across said entrance to cut the film and cooperates with a slot provided in the underside of said cover to form a trap for the entrance which is light-tight but capable of passing a processing fluid when the cassette is immersed in a tank thereof, and means accessible from the exterior of said cassette for manually moving said knife between its two positions.

7. A film processing cassette according to claim 6 which includes a second trap which is light-tight but capable of passing a processing solution, said second trap remotely spaced from said first trap so as to cause circulation of the processing solution over the entire length of film positioned in the cassette.

8. A film processing cassette according to claim 6 wherein the film supporting means in the cassette comprises an open-ended channel shaped film holder which is adapted to support a length of film at its edges when the latter is slid endwise into one end thereof, and a positioning member on said holder which is adapted to cooperate with a complementary positioning member in said cassette for removably positioning said holder with an open end thereof in alignment with said film entrance.

9. A film processing cassette according to claim 6 including a combination shear and guide member fixed to the cassette at one side of the entrance and having a guiding lip extending toward the outer end of said entrance to direct the end of the film from the camera into said cassette, the inner end of said guiding lip terminating in an extension projecting into said cassette and acting as a shear block in conjunction with said reciprocal knife.

10. An auxiliary camera back for use in place of a standard back on a photographic camera including a rotatable member for feeding a film across the focal plane of the camera, and comprising a back complementary in shape and size to said standard back and adapted to fit the camera body in a light-tight manner, means on said back for releasably latching it on said camera body, means at one end of said back for rotatably supporting a supply roll of unexposed film, a light-tight film exit in the other end of said back through which the film is directed immediately after it crosses the focal plane and is exposed, a film feeding knob on said back, and a clutch member connected to said knob and extending to the interior of said back and adapted to drivingly engage said rotatable film feeding member in said camera body when the auxiliary back is placed on said camera body.

11. An auxiliary back for use on a camera body having a rotatable sprocket for engaging the perforations of a film to feed the same across the exposure plane of the camera, and comprising a back adapted to fit said camera body in a light-tight manner, means on said back for releasably latching it on said camera body, means on said back for rotatably supporting a supply roll of unexposed film, a light trapped chute extending through the other end of said back and through which the end of the film from the supply roll is adapted to be pushed by the film feeding sprocket when the back is mounted on said camera body, an axially retractable and rotatable clutch member mounted on the inside of said back to drivingly engage said sprocket, a spring normally urging said clutch member in an axial direction, and a manually operated knob on the outside of said back and connected to said clutch member for retracting said clutch member axially when the back is placed on the camera to effect a driving connection between the same and said sprocket and thereafter serving as a winding knob for rotating the sprocket to feed the film across the exposure plane of the camera.

DOUGLASS C. HARVEY.